United States Patent [19]
Churnside et al.

[11] Patent Number: 5,778,019
[45] Date of Patent: Jul. 7, 1998

[54] AUTODYNE LIDAR SYSTEM UTILIZING A HYBRID LASER

[75] Inventors: James H. Churnside, Boulder, Colo.; Evgenii P. Gordov; Viktor M. Orlovskii, both of Tomsk, Russian Federation

[73] Assignee: The United States of America as represented by the Secretary of Commerce, Washington, D.C.

[21] Appl. No.: 220,012

[22] Filed: Mar. 30, 1994

[51] Int. Cl.$^6$ .................. H01S 3/22; H01S 3/223
[52] U.S. Cl. .................. 372/55; 372/25; 372/97
[58] Field of Search .................. 372/25, 55, 97; 356/5, 28, 28.5

[56] References Cited

U.S. PATENT DOCUMENTS

| | | | |
|---|---|---|---|
| 4,856,893 | 8/1989 | Breen | 356/5 |
| 4,893,923 | 1/1990 | Javan | 358/28.5 |
| 5,029,999 | 7/1991 | Kremer et al. | 356/5 |
| 5,110,207 | 5/1992 | Harris | 356/4.5 |
| 5,125,736 | 6/1992 | Vaninetti | 356/5 |
| 5,164,784 | 11/1992 | Waggoner | 356/28.5 |
| 5,206,698 | 4/1993 | Werner et al. | 356/5 |

*Primary Examiner*—Rodney B. Bovernick
*Assistant Examiner*—Robert E. Wise
*Attorney, Agent, or Firm*—Henderson & Sturm

[57] ABSTRACT

An autodyne lidar system utilizing a hybrid laser. The hybrid laser includes a continuous wave (CW) optical gain section and a pulsed optical gain section in the same laser cavity. A highly reflecting mirror and a partially reflecting mirror, also called an output coupler, form the ends of a laser cavity. Both the continuous wave optical gain section and the pulsed gain section are positioned in the laser cavity. A detector is position in such a manner so as to observe the light reflecting through the cavity.

10 Claims, 3 Drawing Sheets

5,778,019

AUTODYNE LIDAR SYSTEM UTILIZING A HYBRID LASER

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to lidar systems capable of performing Doppler observations and specifically to a lidar system which utilizes a hybrid laser as an autodyne lidar.

BACKGROUND ART

It has long been known that the power in a laser beam is affected by the reflection of part of the output beam back into the laser cavity. This effect has been used in atmospheric optics to measure wind velocities, precipitation fall velocities and for sensitive atmospheric spectroscopy. Autodyne lidar systems employing continuous wave (CW) lasers possess many positive performance characteristics including high noise immunity and high sensitivity making the lidar system more suitable for atmospheric optics applications. Detection sensitivity can be enhanced by operating the laser near threshold. However, when the laser is operated near threshold, few photons are transmitted, and the system performance is substandard.

For atmospheric lidar systems, using a pulsed laser is preferable because range information can be ascertained from the time of flight. Another benefit of a pulsed lidar system is that the system can use short pulses which allows the system to operate with a strong probing signal with moderate average power.

Thus there is a need in an atmospheric lidar system for a hybrid laser which includes both a continuous wave laser section and a pulsed laser section and which allows for the advantages of each laser type to be maximized thereby obtaining an autodyne lidar system with increased sensitivity.

DISCLOSURE OF THE INVENTION

The present invention relates generally to lidar systems capable of performing Doppler observations and specifically to a lidar system which utilizes a hybrid laser as an autodyne lidar. The hybrid laser includes a continuous wave (CW) optical gain section and a pulsed optical gain section in the same laser cavity. A highly reflecting mirror and a partially reflecting mirror, also called an output coupler, form the ends of a laser cavity. Both the continuous wave optical gain section and the pulsed gain section are positioned in the laser cavity. A detector is position in such a manner so as to observe the light reflecting through the cavity.

The present invention has been described in the publication *Optika Atmosphery*. The article, including its figures, is attached as an appendix to this specification and is hereby incorporated by reference in its entirety.

An object of the present invention is to provide an improved autodyne lidar system utilizing a hybrid laser.

Another object of the present invention is to provide an improved autodyne lidar system utilizing a hybrid laser which includes a continuous wave gain section and a pulsed gain section in the same laser cavity.

A further object of the present invention is to provide an improved autodyne lidar system which is more sensitive than a lidar system which does not utilize a hybrid laser.

Other objects, advantages, and novel features of the present invention will become apparent from the following detailed description of the invention when considered in conjunction with the accompanying drawings.

BEST MODES FOR CARRYING OUT THE INVENTION

Figure 1:
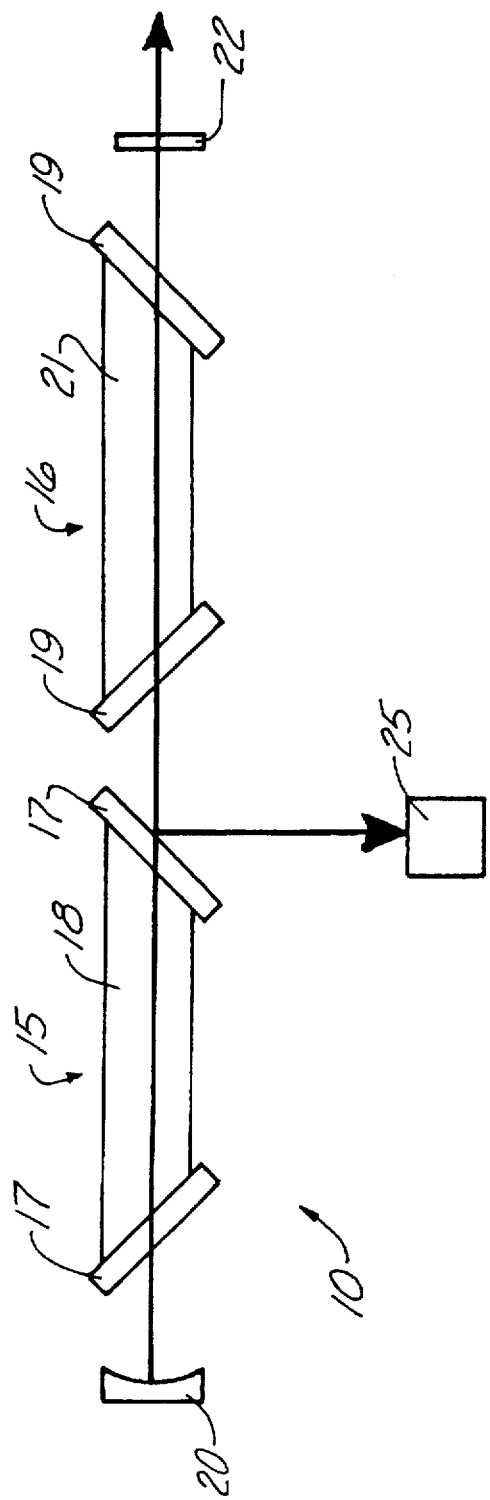
FIG. 1 is a schematic diagram of a hybrid laser for use as an autodyne lidar built in accordance with the present invention.

Referring now to the drawings wherein like reference numerals designate identical or corresponding parts throughout the several views, FIG. 1 shows a hybrid laser (10) for use in a lidar system built in accordance with the present invention. The hybrid laser (10) includes a continuous-wave (CW) optical gain section (15) and a pulsed optical gain section (16). The continuous-wave (CW) optical gain section (15) is continuously pumped by an appropriate mechanism such as an electrical discharge. By continuously pumping the continuous-wave (CW) optical gain section (15) an inversion on an appropriate absorption line is obtained. The pulsed optical gain section (16) operates in a fashion similar to that of the continuous-wave (CW) optical gain section (15) with the exception being that the pumping mechanism is pulsed rather than operating continuously.

The hybrid laser also includes a highly reflecting mirror (20) and a partially reflecting mirror (22). The laser cavity is formed between the highly reflecting mirror (20) and the partially reflecting mirror (22). The highly reflecting mirror (20) forms the rear of the laser cavity and reflects light back through the continuous-wave (CW) optical gain section (15) and the pulsed optical gain section (16). The partially reflecting mirror (22) forms the front of the laser cavity and reflects part of the light back through the continuous-wave (CW) optical gain section (15) and the pulsed optical gain section (16). The light that is not reflected back into the laser cavity is allowed to escape.

When the pulsed optical gain section (16) is not being pumped, the continuous-wave (CW) optical gain section (15), the highly reflecting mirror (20) and the partially reflecting mirror (22) operate as a continuous-wave (CW) laser. The resonant laser cavity is formed by the highly reflecting mirror (20) and the partially reflecting mirror (22). While the continuous-wave (CW) optical gain section (15) is being pumped, light is propagated by the highly reflecting mirror (20) back through the continuous-wave optical gain section (15) where it is amplified. A portion of the light is absorbed by the pulsed optical gain section (16) as it propagates toward the partially reflecting mirror (22). Part of the light which reaches the partially reflecting mirror (22) is transmitted through the partially reflecting mirror (22) and escapes the laser cavity. The non-escaping light is reflected back into the resonant laser cavity. As the light propagates toward the highly reflecting mirror (20), a portion of the light is absorbed by the pulsed optical gain section (16) and the light is amplified by the continuous-wave (CW) optical gain section (15). The light then reaches the highly reflecting mirror (20) where the above described cycle begins again.

The mirrors are such that the amount of light escaping out the sides of the of the resonant laser cavity is negligible. With the continuous wave (CW) optical gain section (15) operating above threshold, the gain of the continuous-wave (CW) optical gain section (15) is such that it more than compensated for the loss of light due to the absorption of the pulsed optical gain section (16) and the loss of light which escapes the cavity at the partially reflecting mirror (22).

When the pulsed optical gain section (16) of the hybrid laser (10) is pumped by a pulse of energy, the gain increases and a burst of light escapes through the partially reflecting mirror. Because the pulsed optical gain section (16) is seeded by the continuous-wave light, the light from the pulsed optical gain section (16) is emitted in the same longitudinal mode of the cavity in which the continuous wave optical gain section is operating. This technique has been used in the past for longitudinal mode control of a pulsed laser.

When the increased gain pulse is reflected from a target object outside the laser cavity, part of the energy will be reflected back to the laser. A portion of the energy will enter the laser cavity through the partially reflecting mirror (22) and add to the intracavity field. If the target object is moving, the reflected light will be Doppler shifted. The addition caused by the Doppler shift will be alternately constructive and destructive. Therefore, the intracavity field will be modulated at the Doppler frequency.

The hybrid laser (10) also includes a detector (25) for observing the intracavity light by looking at some other source of cavity loss. As shown on FIG. 1, the source is the reflection from one of the zinc-selenium (ZnSe) windows (17) at the end of the continuous wave optical gain section (15). However, other sources are possible and include replacing the highly reflecting mirror (20) with another partially reflecting mirror and observing the light which escapes, inserting a beam splitter into the cavity, and looking at the reflection from one end of the pulsed optical gain section (16).

In a best mode embodiment of the present invention, the highly reflecting mirror (20) is a total reflector with a five (5) meter focal length. The partially reflecting mirror (22), also called an output coupler, is a plane mirror with a 0.8 reflectivity value. The laser cavity formed between the highly reflecting mirror (20) and the partially reflecting mirror (22) is two and one-half (2.5) meters in length.

The continuous wave (CW) optical gain section (15) is positioned in the rear of the laser cavity. The continuous wave (CW) optical gain section (15) is a one (1) meter glass tube (18) of low pressure $CO_2$ pumped by a longitudinal direct current (dc) electric discharge with zinc-selenium (ZnSe) windows (17) positioned at near Brewster's angle at each end of the glass tube (18). Disposed within the zinc-selenium (ZnSe) windows (17) are electrodes used for pumping the continuous wave (CW) optical gain section (15). The residual or reflection from one of these windows (17) was directed into the detector (25) where it is observed. With only the continuous wave (CW) optical gain section (15) pumped, several watts of output is attainable.

The pulsed optical gain section (16) is position in the front of the laser cavity. The pulsed optical gain section (16) is a $CO_2$ filled glass tube (21) with zinc-selenium (ZnSe) windows (19) positioned at near Brewster's angle at each end of the glass tube (21). Disposed within the zinc-selenium (ZnSe) windows (21) are electrodes used for pumping the pulsed optical gain section (16). The glass tube (21) is a thirty (30) centimeters long with a cross section of one (1) centimeter by three (3) centimeters. This section is at atmospheric pressure and is electron-beam pumped. The laser is pulsed at a rate of four (4) Hz. With the continuous wave (CW) optical gain section (15) in the laser cavity but not pumped, the output is fifteen (15) microjoules in a three hundred nanosecond (300 ns) pulse.

Obviously many other types of lasers can be used in the present invention in addition to the carbon dioxide ($CO_2$) lasers described above. For example a solid crystal laser would also work in the present invention. Also, the lasers need not have ends at Brewster's angle. The ends could be in any configuration which helps to minimize the amount of light which is reflected out of the laser cavity.

The detector (25) includes a photodiode sensor. In a preferred embodiment, the photodiode sensor is of the mercury-cadmium-tellurium (HgCdTe) type. The detector (25) can also includes an amplifier to amplify the detected signal. The detector can also include or be connected to a spectrum analyzer. The spectrum analyzer is used to measure the Doppler shift present in the detected signal. From the Doppler shift, the radial velocity of the target object can be determined. The spectrum analysis could be conducted in a computer which is interfaced with the hybrid laser. The use of a spectrum analyzer to analyze the detected signal, as well as the subsequent determination of the Doppler shift and the velocity of the target object, are well known to one skilled in the art in the field of lidar and radar systems.

Figure 2:
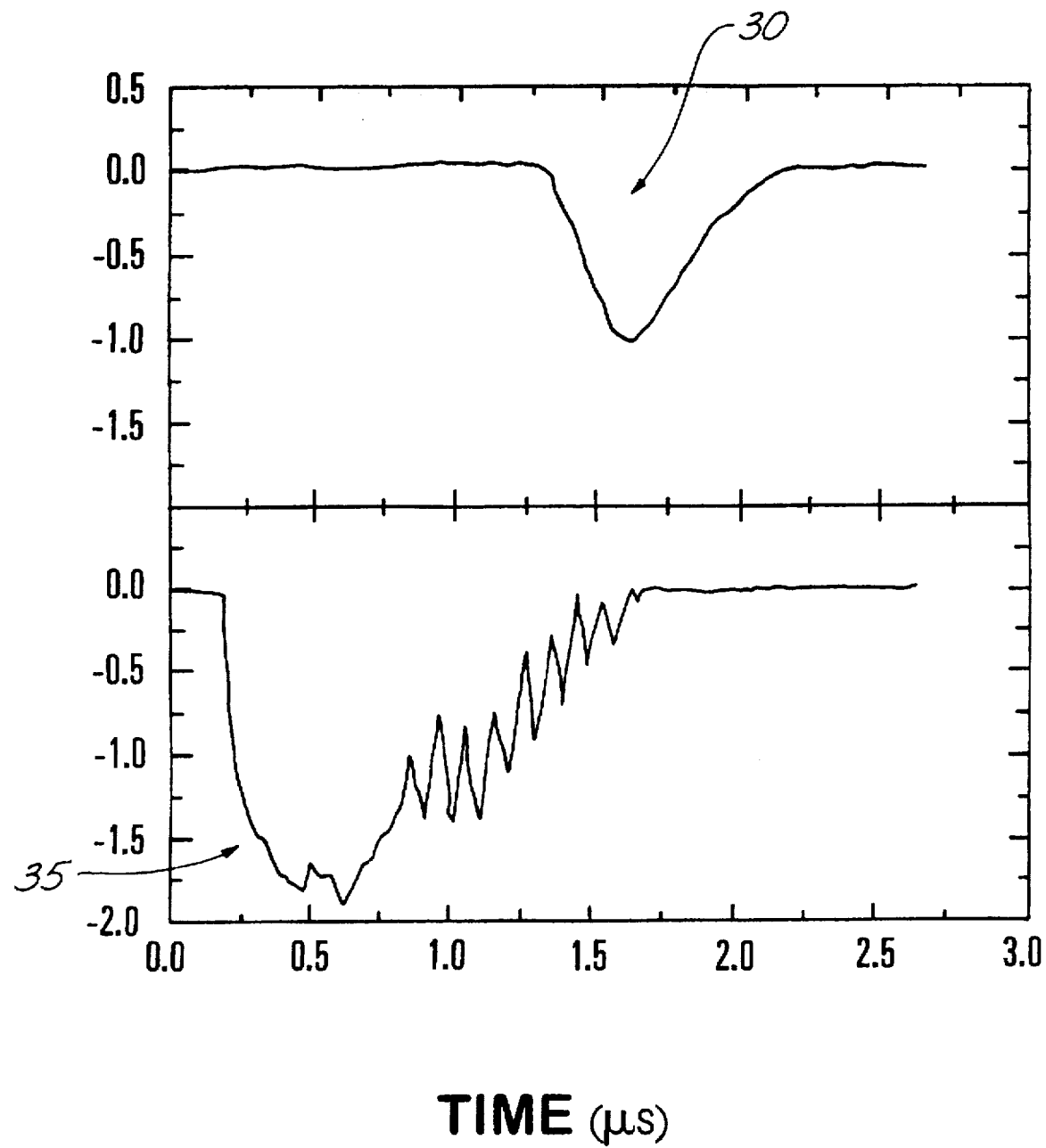
FIG. 2 is a representation of signal traces of the output pulses of a hybrid laser of FIG. 1.

Referring now to FIG. 2, a graph of representative traces from a autodyne hybrid laser built in accordance with the present invention are shown. The upper trace (30) is indicative of a trace of a typical pulse with the continuous wave optical gain section (15) turned off. The zero time reference is at the pump pulse and there is a delay of approximately 1.3 microseconds (μs) followed by a relatively smooth pulse. The second trace (35) is indicative of a trace of a pulse with the continuous wave optical gain section (15) turned on. As can be seen, the output characteristics of the pulse were modified. Because the system is already operating above threshold when the continuous wave optical gain section (15) is on, the delay between the electron-beam pump and the pulse is nearly eliminated. Additionally, the pulse length is increased by approximately eight hundred nanoseconds (800 ns). The oscillation in the tail of the pulse in the lower trace (35) is caused by the interference of longitudinal nodes as well as by influence of the pumping pulse.

Figure 3:
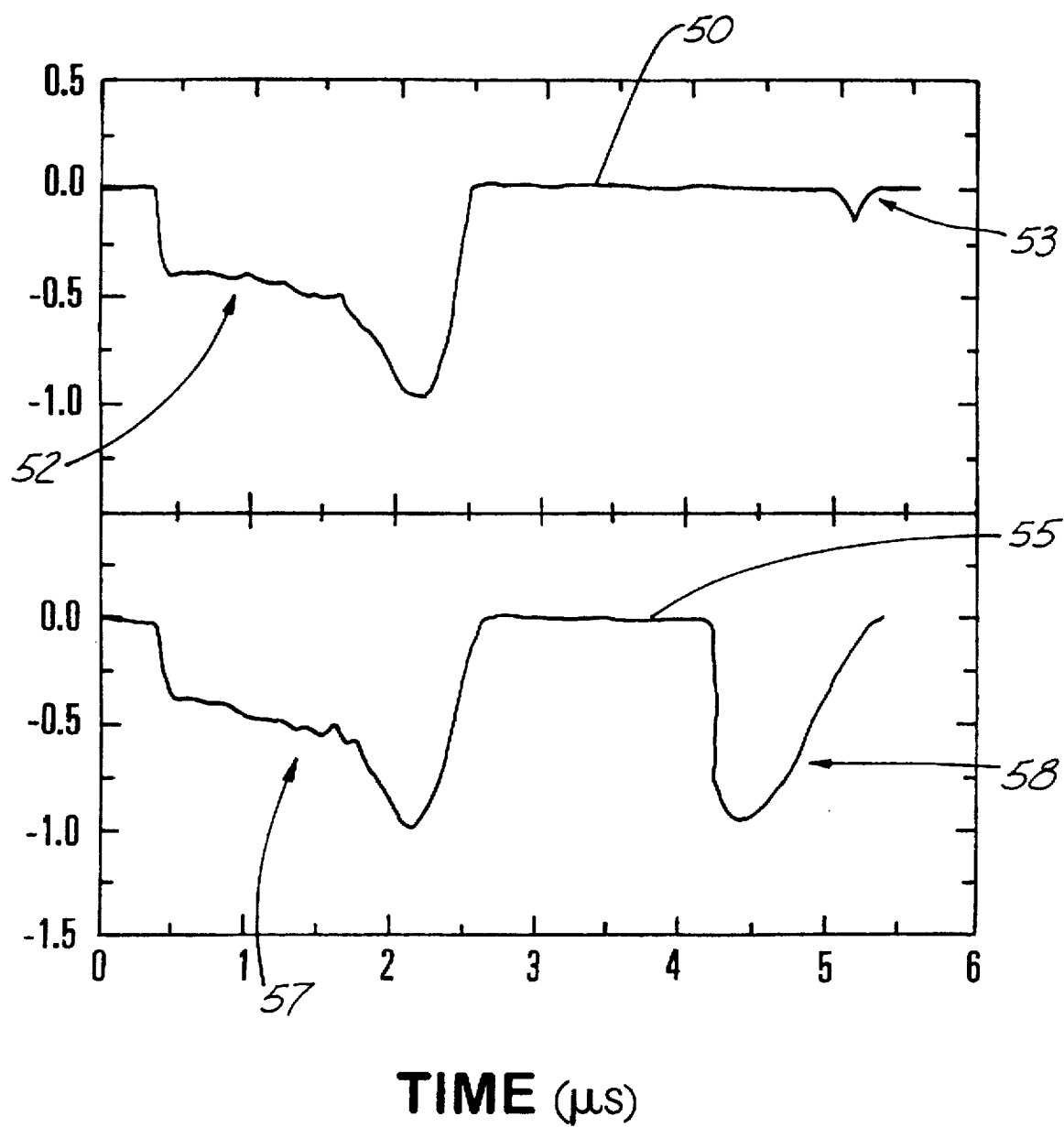
FIG. 3 is a representation of signal traces of output pulses and return signals of another embodiment of a hybrid laser built in accordance with the present invention.

In another embodiment of the present invention, a lidar system similar to the one shown in FIG. 1 can be built which utilizes a lower gain continuous wave gain section. In this embodiment, the continuous wave gain section is fifty (50) centimeters in length and produces approximately one (1) watt of power when the pulse gain section is not pumped. Referring now to FIG. 3, traces of typical output pulse and return signal are shown with and without the continuous wave gain section being pumped. In the upper trace (50), the continuous wave gain section is not pumped. The first section (52) of the upper trace represents the output pulse of the lidar system. The second section (53) of the upper trace represents the return signal of the output pulse (52) having reflected off a mirror 400 meters from the laser.

In the lower trace (55), the continuous wave gain section is pumped. The first section (57) of the lower trace represents the output pulse of the lidar system. As can be seen, it is very similar to the output pulse (52) depicted in the upper trace (50). The second section (58) of the lower trace (55) represents the return signal of the output pulse (57) having reflected off the mirror 400 meters from the laser. As can clearly be seen, the return signal (58) when the continuous wave gain section is pumped is clearly larger than the return signal (53) when the continuous wave gain section is not pumped. Thus the use of the hybrid laser in the lidar system amplifies significantly the echo-signal.

Obviously, many modifications and variations of the present invention are possible in light of the above teachings. It is therefore to be understood that, within the scope of the appended claims, the invention may be practiced otherwise than as specifically described.

We claim:

1. A hybrid laser for an autodyne lidar system comprising:

a laser cavity;

a continuous-wave (CW) optical gain section disposed within said laser cavity;

means for pumping said continuous-wave (CW) optical gain section in a continuous fashion;

a pulsed optical gain section disposed within said laser cavity;

means for pumping said pulsed optical gain section in a pulsed fashion;

highly reflecting mirror means disposed at one end of said laser cavity for reflecting light back through said continuous-wave (CW) optical gain section and said pulsed optical gain section;

partially reflecting mirror means disposed at the other end of said laser cavity for partially reflecting light back though said continuous-wave (CW) optical gain section and said pulsed optical gain section wherein the light not reflected back through the continuous-wave (CW) optical gain section and said pulsed optical gain section is allowed to escape; and detector means for observing the light transmitted within said laser cavity.

2. The hybrid laser of claim 1:

wherein said continuous-wave (CW) optical gain section comprises a first carbon dioxide ($CO_2$) laser; and wherein said pulsed optical gain section comprises a second carbon dioxide ($CO_2$) laser.

3. The hybrid laser of claim 2:

wherein said first carbon dioxide ($CO_2$) laser includes two zinc-selenium (ZnSe) windows placed at Brewster's angle; and wherein said second carbon dioxide ($CO_2$) laser includes two zinc-selenium (ZnSe) windows placed at Brewster's angle.

4. The hybrid laser of claim 2:

wherein said first carbon dioxide ($CO_2$) laser includes windows placed at an angle so as to minimize light reflection out of said laser cavity; and wherein said second carbon dioxide ($CO_2$) laser includes windows placed at angle so as to minimize light reflection out of said laser cavity.

5. The hybrid laser of claim 1 wherein said detector means includes a photodiode sensor.

6. The hybrid laser of claim 5 wherein said photodiode is a mercury-cadmium-tellurium (HgCdTe) type photodiode sensor.

7. The hybrid laser of claim 1 wherein said detector means includes an amplifier for amplifying the detected signal.

8. The hybrid laser of claim 1 wherein said means for pumping said continuous-wave (cw) optical gain section maintains said continuous-wave (CW) optical gain section at or above threshold.

9. A hybrid laser for an autodyne lidar system comprising:

a laser cavity;

a continuous-wave (CW) optical gain section disposed within said laser cavity wherein said means for pumping said continuous-wave (CW) optical gain section maintains said continuous-wave (CW) optical gain section at or above threshold;

means for pumping said continuous-wave (CW) optical gain section in a continuous fashion;

a pulsed optical gain section disposed within said laser cavity;

means for pumping said pulsed optical gain section in a pulsed fashion;

highly reflecting mirror means disposed at one end of said laser cavity for reflecting light back through said continuous-wave (CW) optical gain section and said pulsed optical gain section;

partially reflecting mirror means disposed at other end of said laser cavity for partially reflecting light back though said continuous-wave (CW) optical gain section and said pulsed optical gain section wherein the light not reflected back through the continuous-wave (CW) optical gain section and said pulsed optical gain section is allowed to escape;

detector means for observing the light transmitted within said laser cavity;

wherein said continuous-wave (CW) optical gain section comprises a first carbon dioxide ($CO_2$) laser, said first carbon dioxide ($CO_2$) laser includes two zinc-selenium (ZnSe) windows placed at Brewster's angle;

wherein said pulsed optical gain section comprises a second carbon dioxide ($CO_2$) laser, said second carbon dioxide ($CO_2$) laser includes two zinc-selenium (ZnSe) windows placed at Brewster's angle; and wherein said detector means includes a mercury-cadmium-tellurium (HgCdTe) type photodiode sensor.

10. The hybrid laser of claim 9 wherein said detector means includes an amplifier for amplifying the detected signal.

* * * * *